US010573186B2

(12) United States Patent
Venkataraman et al.

(10) Patent No.: US 10,573,186 B2

(45) Date of Patent: Feb. 25, 2020

(54) SYSTEM AND METHOD FOR MONITORING CONFORMANCE OF AN AIRCRAFT TO A REFERENCE 4-DIMENSIONAL TRAJECTORY

(71) Applicant: HONEYWELL INTERNATIONAL INC., Morris Plains, NJ (US)

(72) Inventors: Kiran Mancheiah Venkataramana, Karnataka (IN); Mohan Gowda Chandrashekarappa, Karnataka (IN); Prashanth Thirumalaivenjamur, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 98 days.

(21) Appl. No.: 15/839,345

(22) Filed: Dec. 12, 2017

(65) Prior Publication Data

US 2019/0180631 A1 Jun. 13, 2019

(51) Int. Cl.
*G08G 5/00* (2006.01)
*G01S 13/00* (2006.01)

(52) U.S. Cl.
CPC ......... *G08G 5/0039* (2013.01); *G08G 5/0013* (2013.01); *G08G 5/0043* (2013.01); *G08G 5/0047* (2013.01)

(58) Field of Classification Search
CPC ........ G08G 5/00; G08G 5/003; G08G 5/0013; G08G 5/0039; G08G 5/0043;
(Continued)

(56) References Cited

U.S. PATENT DOCUMENTS

| | | | | |
|---|---|---|---|---|
| 6,393,358 | B1 * | 5/2002 | Erzberger | G01S 7/22 340/961 |
| 8,275,499 | B2 | 9/2012 | Coulmeau et al. | |

(Continued)

FOREIGN PATENT DOCUMENTS

| | | | |
|---|---|---|---|
| EP | 2287822 | A2 | 2/2011 |
| EP | 2631890 | A2 | 8/2013 |

(Continued)

OTHER PUBLICATIONS

Lee, S. et al; Conformance Monitoring Method based 4D Trajectory Modeling Using Aircraft Performance Data; Journal of Convergence, vol. 5, No. 2, Jun. 2014.

(Continued)

*Primary Examiner* — Yonel Beaulieu
(74) *Attorney, Agent, or Firm* — Lorenz & Kopf, LLP

(57) ABSTRACT

Methods and systems are provided for monitoring conformance of an aircraft to an actual and predicted 4-dimensional (4D) trajectory with respect to a reference business trajectory (RBT). First, a flight plan for the aircraft is acquired from an onboard flight management system (FMS) computer. A predicted flight trajectory is generated based on the latitude, longitude, altitude, speed and time of the flight plan for the aircraft. An onboard trajectory conformance monitor that is independent of the FMS computer, monitors the present flight trajectory of the aircraft and anticipates any actual or future deviations from the RBT. The trajectory conformance monitor will generate an advisory of any actual or anticipated deviations from the RBT.

20 Claims, 5 Drawing Sheets

(58) Field of Classification Search
CPC ...... G08G 5/0047; G01C 21/20; G01C 21/26; G01S 13/00; G01S 13/91
See application file for complete search history.

(56) References Cited

U.S. PATENT DOCUMENTS

| | | | | |
|---|---|---|---|---|
| 8,467,919 | B2 | 6/2013 | Klooster | |
| 8,560,148 | B2 | 10/2013 | Torres et al. | |
| 8,731,810 | B2 | 5/2014 | Conway | |
| 8,818,696 | B2 | 8/2014 | Klooster et al. | |
| 9,542,849 | B1 | 1/2017 | Bertram et al. | |
| 9,715,832 | B2 | 7/2017 | Pierre et al. | |
| 9,741,254 | B2 | 8/2017 | Navarro et al. | |
| 2003/0130771 | A1 | 7/2003 | Crank | |
| 2012/0191331 | A1* | 7/2012 | Torres | G08G 5/0013 701/120 |
| 2013/0080043 | A1* | 3/2013 | Bailin | G08G 5/0034 701/120 |
| 2014/0277853 | A1 | 9/2014 | Castillo-Ellen et al. | |
| 2015/0332490 | A1* | 11/2015 | Coulmeau | G06T 11/206 701/3 |
| 2016/0343258 | A1* | 11/2016 | Navarro | G01C 21/20 |
| 2017/0365178 | A1* | 12/2017 | Shay | G08G 5/045 |
| 2018/0240348 | A1* | 8/2018 | Ren | G08G 5/0013 |
| 2019/0012925 | A1* | 1/2019 | Barker | G08G 5/0013 |

FOREIGN PATENT DOCUMENTS

| | | | |
|---|---|---|---|
| EP | 2649603 | A1 | 10/2013 |
| WO | 2015193125 | A1 | 12/2015 |

OTHER PUBLICATIONS

Ramasamy, S. et al.; Next Generation Flight Management System for Real-Time Trajectory Based Operations; Article in Applied Mechanics and Materials, Oct. 2014.

Konyak, Michael A., et al., "Improving Ground-Based Trajectory Prediction through Communication of Aircraft Intent," AIAA Guidance, Navigation, and Control Conference, Aug. 10-13, 2009, AIAA 2009-6080.

* cited by examiner

SYSTEM AND METHOD FOR MONITORING CONFORMANCE OF AN AIRCRAFT TO A REFERENCE 4-DIMENSIONAL TRAJECTORY

TECHNICAL FIELD

The present invention generally relates to aircraft flight operations, and more particularly relates to monitoring conformance of an aircraft's actual and predicted 4-dimensional trajectory to a reference business trajectory.

BACKGROUND

With air traffic around the world growing at an increasing pace, management of congestion and maintaining safe and efficient air operations is of paramount importance. Planning of air operations typically involves the use of air traffic control (ATC) approved designated flight paths that provide the most optimal routes for aircraft. The designated flight paths may be further broken down into a 4-dimensional (4D) trajectory of the aircraft parameters including latitude, longitude, altitude, speed and time that an aircraft should maintain for operational efficiency. Multiple aircraft with varying equipment and capabilities share the same airspace. Based on the capabilities of the aircraft and onboard avionics, the flight trajectories flown by the aircraft may significantly vary. It is cumbersome to monitor the aircraft with reference to only the cleared flight plans. It is advantageous to assign flight routes and clearances to aircraft with knowledge of the actual 4D trajectories operating in the airspace.

As a result, there is a need for monitoring conformance of an aircraft's actual and predicted 4D trajectory.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for monitoring conformance of an aircraft actual and a predicted 4-dimensional (4D) trajectory to a reference business trajectory (RBT). The method comprises: defining an RBT for the aircraft as a set of rules which ensure the conformance of an aircraft trajectory to the prevailing airspace constraints, rules and systems performance standards; acquiring a flight plan for the aircraft from an onboard flight management system (FMS) computer; acquiring a predicted 4D flight trajectory corresponding to the flight plan from the FMS computer, where the predicted flight trajectory is based on the latitude, longitude, altitude and time of the flight plan for the aircraft; monitoring actual and predicted portions of the 4D flight trajectory of the aircraft with an onboard trajectory conformance monitor that is independent of the FMS computer; anticipating future deviations of the predicted flight trajectories to the RBT; and generating an advisory for an aircrew member of the aircraft of the anticipated future deviations from the predicted flight trajectory to the RBT.

A system is provided for monitoring conformance of an aircraft predicted 4-dimensional (4D) flight trajectory to a reference business trajectory (RBT). The apparatus comprises: an RBT generator located on a central cloud server remote to the aircraft and accessed via a communication channel, where the RBT generator generates, stores and provides RBTs for the aircraft; a flight management system (FMS) computer located on board the aircraft, where the FMS, retrieves and stores a flight plan for the aircraft, generates a predicted 4D flight trajectory based on the flight plan for the aircraft, where the predicted 4D flight trajectory is based on latitude, longitude, altitude, speed and time of the flight plan for the aircraft, and monitors aircraft flight parameters during flight; a trajectory conformance monitor located on board the aircraft, where the trajectory conformance monitor is configured to, retrieve the predicted 4D flight trajectory corresponding to the flight plan from the FMS, anticipate future deviations of the predicted 4D flight trajectory from the RBT based on the aircraft flight parameters, and generate an advisory of any predicted deviations from the RBT; and a ground-based server that receives and stores the advisories and associated flight and trajectory information issued by the trajectory conformance monitor.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
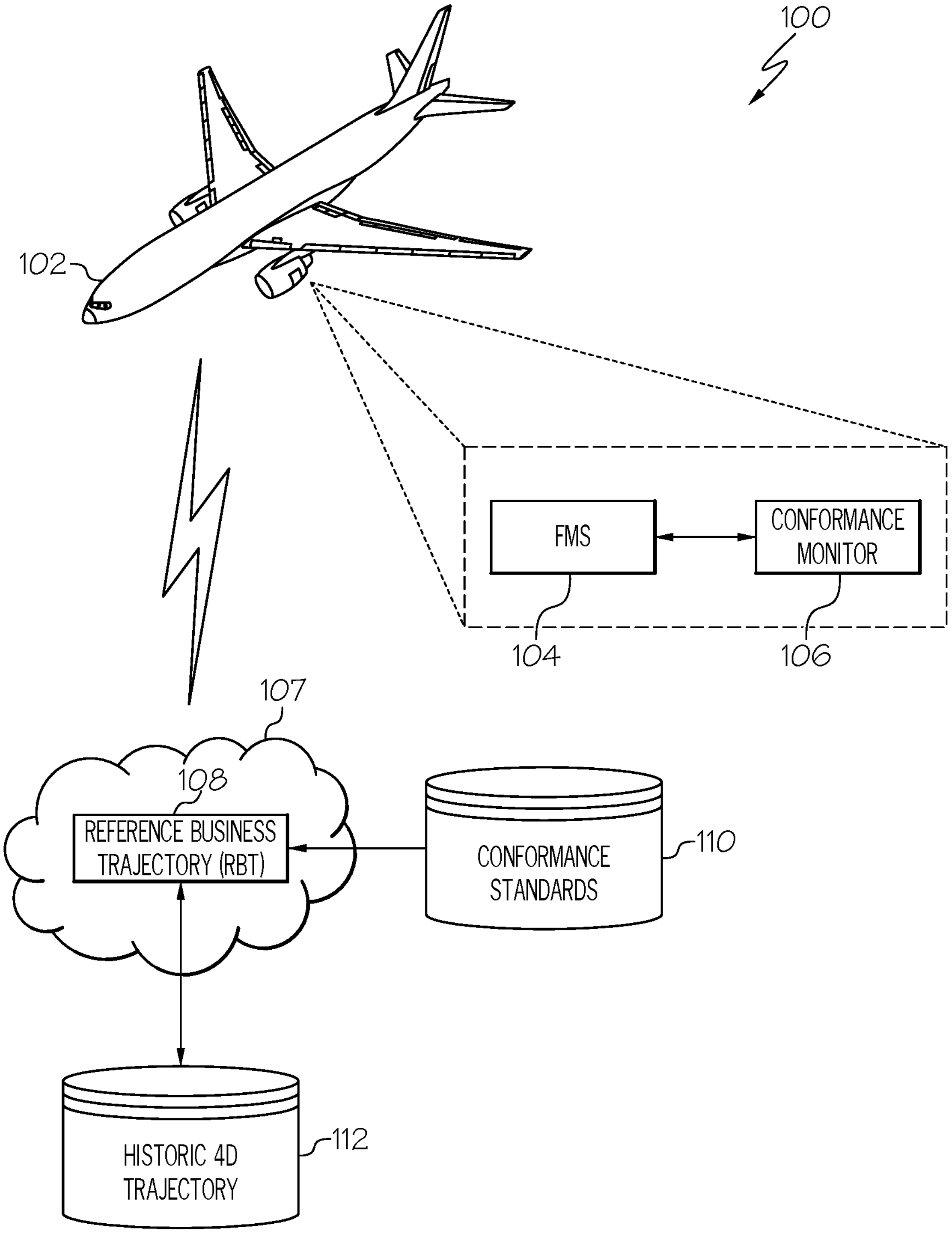
FIG. 1 shows a block diagram of a system for monitoring conformance of an aircraft to an actual and predicted 4-dimensional trajectory in accordance with one embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Aircraft fly an associated flight plan by generating a 4D trajectory using a flight Management System (FMS) computer onboard the aircraft. The 4D trajectory is often referred to as a "Predicted 4D Trajectory" and the aircraft navigates by advancing over this route. The trajectory immediately ahead of the aircraft often referred to as a "Tactical 4D Trajectory" and the remaining trajectory is referred to as a "Down Path 4D Trajectory". These 4D trajectories are often built into the FMS computers.

Although flight plans are filed and aircraft attempt to adhere to them, Air Traffic Controllers (ATC) and pilots are constantly monitoring the aircraft in the given airspace to ensure that they do not deviate from their approved flight plans. A designated flight plan is typically composed of a contiguous sequence of ARINC 424 lateral legs from the origin to the destination. It is advantageous to define an ideal 4D trajectory which will incorporate at minimum the approved flight plan but will also consider other constraints of the airspace, temporary restrictions, minimum performance requirements, lateral and vertical deviation allowable limits etc. This ideal 4D trajectory defined and referred to as a "Reference Business Trajectory (RBT)".

A Reference Business Trajectory (RBT) is a 4D trajectory defined for a specific airframe as a combination of: terminal area and enroute airspace restrictions; Minimum Aviation System Performance Standards (MASPS); Aeronautical Information Publications (AIPs); Prevailing Notice to Airmen (NOTAMs); Temporary Flight Restrictions (TFRs); Terrain Avoidance Trajectories; Weather and Turbulence Avoidance Trajectories; Lateral and Vertical Deviation Error Considerations (DO236, AMC 20-26 etc.); Required Area Navigation Performance (RNAV/RNP) Considerations; etc. The RBT may additionally be blended and refined by considering the historic trajectories flown by specific types of aircraft. An RBT is therefore, in simple terms, an idealistic 4D trajectory defined as a set of lateral and vertical banding rules based on all the constraints that apply to for executing a safe flight in the designated airspace used by the aircraft. It should be understood and appreciated that the set of conforming rules described in the definition of RBT are only exemplary in nature and the definition may be expanded to incorporate additional rulesets or standards currently in other embodiments that apply to trajectory definition of an aircraft.

The RBT may be defined as a sequence of segments in 4 dimensions or as a set of rules which may be used for comparison. A concept conformance monitor automates the responsibility of comparing the aircraft generated 4D trajectory to an RBT. Any deviations of the aircraft's computed trajectory to the RBT will indicate non-conformance to a specific rule as defined by the RBT. The conformance monitor function aggregates these responsibilities of generating the RBT, accessing the RBT and the aircraft predicted profiles, comparing them against each other and advising for non-conformances. The conformance monitor can be an aid for ensuring conformance of aircraft to safety and operational standards and considerations.

A method and system for monitoring conformance of an aircraft's actual and predicted 4D trajectory to an RBT has been developed. In an exemplary embodiment, a flight plan for the aircraft is acquired by an onboard FMS computer. The flight plan is used to generate a predicted flight trajectory in 4D. This includes the parameters of latitude, longitude, altitude, speed and time for the aircraft. An onboard trajectory conformance monitor that is independent of the FMS monitors the present flight trajectory of the aircraft. The conformance monitor anticipates any future deviations of the computed predicted 4D flight trajectory from the RBT. If the aircraft is anticipated to deviate from the RBT an advisory is generated for the aircrew of the aircraft.

Turning now to FIG. 1, a block diagram of a system 100 that monitors conformance of an aircraft predicted 4D trajectory to an RBT is shown in accordance with one embodiment. In this embodiment, the aircraft 102 has an FMS 104 on board along with a trajectory conformance monitor 106. The FMS 104 and the conformance monitor 106 are separate and independent of each other. In some embodiments, the trajectory conformance monitor may be part of an electronic flight bag (EFB) or other mobile communications device such as a tablet, etc. This is done to maintain the integrity of the 4D trajectory monitoring by the conformance monitor 106. The trajectory conformance monitor 106 may also include a graphical display device as an integrated component. The graphical display device may be used to display advisories to the aircrew of predicted deviations from the actual and a predicted flight trajectory. Additionally, advisories may be presented graphically on the display device or presented aurally to the user or through any alternate annunciation mechanisms.

The aircraft 102 maintains a communications data link with a cloud-based data source 107. In other embodiments, the cloud-based data source may be a ground-based central server. The data source 107 provides the FMS 104 with an RBT 108. Acceptance of an RBT is a representation of the airspace user's intended flight path and filed/published flight plan with respect to a given flight. The RBT is intended to guarantee the best possible outcome for the flight as seen from the air user's perspective. The conformance monitor may access the RBT from the cloud-based data source continuously or retrieve from the cloud-based data source and store on the conformance monitor for continued use.

The RBT 108 accesses external databases 110 of various conformance standards for aircraft flight data. The use of these standards ensure that the RBT trajectory may conform to such standards as: the enroute and Terminal Area Procedure Design described in the state Aeronautical Information Publication (AIP); terminal area procedure charts; Standard Instrument Departures (SIDS); Standard Terminal Arrival Routes (STARS); Approaches; Airways; the Minimum Aviation System Performance Standards (MASPS) for Area Navigation and Required Navigation Performance (RNAV, D0236, AMC 20-26, etc.); airspace Required Navigation Performance (RNP) and specified turn radius containment requirements; static and dynamic Notice to Airmen (NOTAM); Pilot Reports (PIREP); Automatic Terminal Information Service (ATIS) notifications; Flight Interruption Manifests (FIM); airspace permissible noise and carbon emissions levels; Temporary Flight Restrictions (TFR); and any other external conditions including weather, traffic and environmental information that may affect the operation of the flight.

The communications data link between the aircraft 102 and the cloud-based data source 107 provides connectivity that allows the transfer of an RBT 107 to the FMS 104, and conformance data to the actual and predicted 4D flight trajectory from the conformance monitor 106 to the cloud-based data source 107. In some embodiments, the cloud-based data source 107 will also provide the data from the conformance monitor 106 to ground-based ATC. This data may include an advisory of actual or anticipated future deviations from a predicted flight trajectory. In some embodiments, the ATC is notified of such deviations using the Air Communications Addressing and Reporting System (ACARS) communication protocol. The data link may also use satellite communications (SATCOM) or other similar capable broadband connectivity communications protocols.

Conformance to the actual and predicted 4D flight trajectory and other related historic 4D flight trajectory data is stored in an electronically retrievable database 112. The data may be retrieved post flight for analysis which can derive intelligence about efficient and conformable flight procedures. For example, certain flight procedures and routes may not be applicable to certain types of aircraft. Such performance issues could be detected by analysis of multiple flight trajectory data from similar aircraft on similar flight plans. Additionally, noise abatement regions and carbon emissions levels for certain regions may change over time. The historic trajectory database 112 may be used analyze and compensate for these changes.

Figure 2:
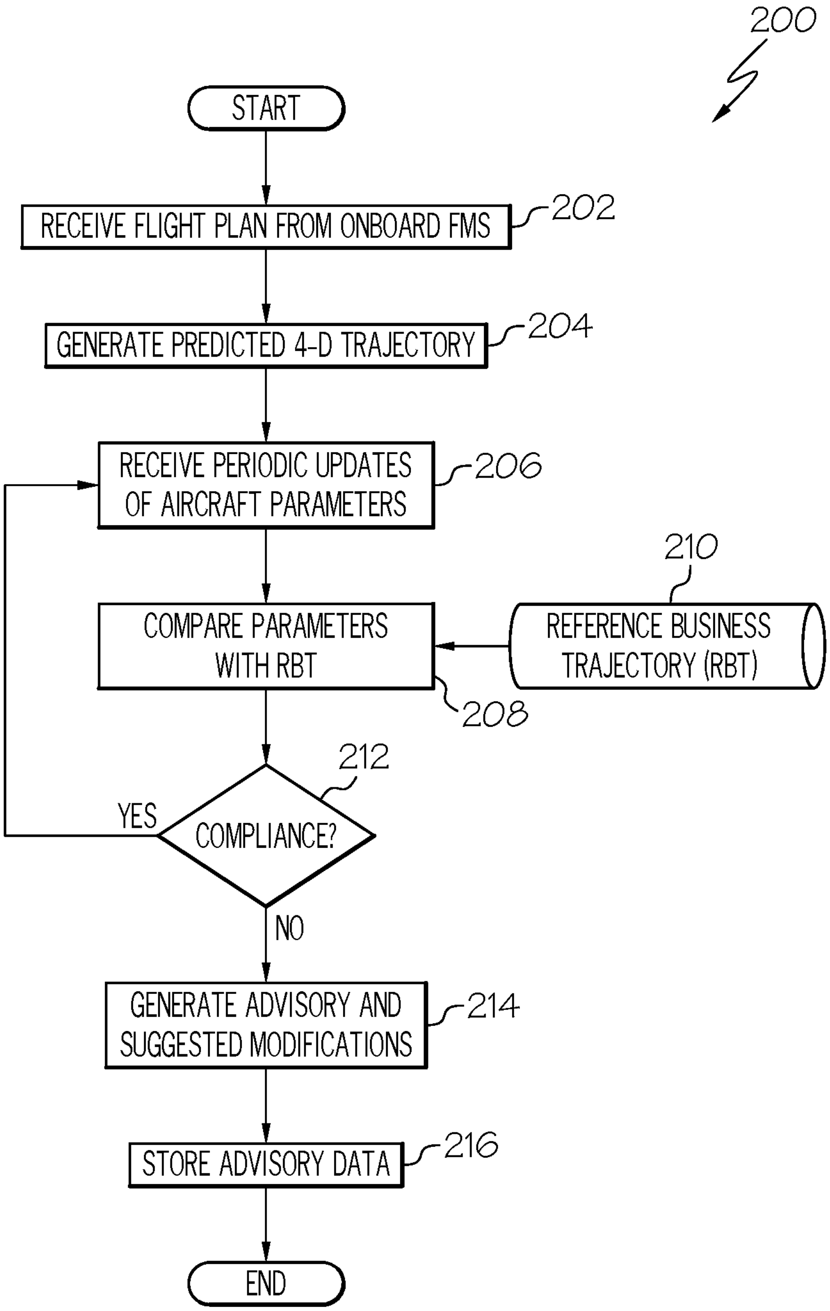
FIG. 2 shows a flowchart of a method for monitoring conformance of an aircraft to an actual and predicted 4-dimensional trajectory in accordance with one embodiment.

Turning now to FIG. 2, a flowchart is shown of a method 200 for monitoring conformance of an aircraft to an actual or "tactical" and a predicted 4-dimensional trajectory in accordance with one embodiment. First, a flight plan for the aircraft is acquired by an onboard FMS 202. The flight plan is the basis for a predicted flight trajectory that includes the dimensions of: latitude; longitude; altitude; and time-of-flight of the aircraft 204. An onboard trajectory conformance monitor, that is independent of the FMS computer, periodically monitors the present flight trajectory of the aircraft and receives periodic updates of the aircraft parameters 206. If any aircraft parameter affect the 4D flight trajectory computation, the trajectory is refined based on the updated aircraft parameters (speed, altitude, wind, etc.). The trajectory conformance monitor compares the parameters with the conformance standards 208 that have been previously downloaded from various aircraft conformance standards sources 210. If the actual or predicted 4D flight trajectory is not in compliance with the RBT 212, the conformance monitor will generate an advisory for an aircrew member of the aircraft that notifies them of the actual or anticipated future deviations 214 from the predicted trajectory. The advisory may also provide suggested corrective actions for the aircraft crew member to correct the actual or anticipated deviations. Additionally, the conformance monitor may have predetermined allowable limits for actual or anticipated future deviations. This limit allows an aircrew sufficient time to correct the actual or anticipated deviation prior to generating an advisory. Finally, the advisory and related data are stored in electronic retrievable database for post flight analysis 216.

Though the conformance monitor system is described as a system onboard an aircraft, one should also appreciate that the conformance monitor can be hosted remotely to the aircraft. For example, the conformance monitor system may be hosted in the Air Traffic Controller (ATC) or the Airline Operations Center (AOC). This allows conformance of multiple aircrafts in a given airspace region to be monitored for conformance to their respective RBTs. In such embodiments, a data link connectivity channel from the aircraft to the remote conformance monitor system will make available the essential aircraft data of predicted 4D flight trajectory and aircraft state parameters.

Figure 3:
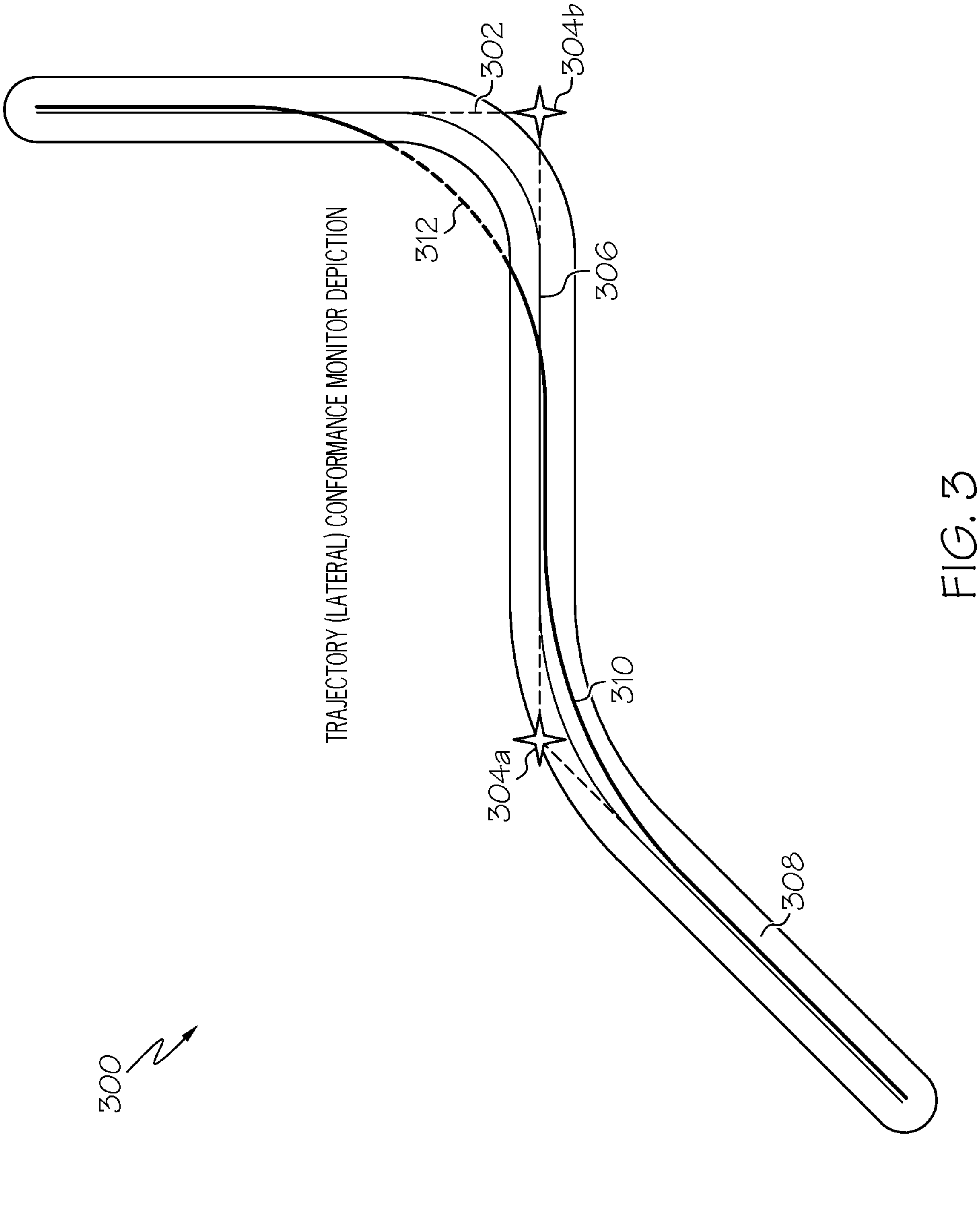
FIG. 3 shows a diagram depicting of a conformance monitor lateral view for a flight path of an aircraft in accordance with one embodiment.

Turning now to FIG. 3, a diagram is shown of a graphic depiction of a conformance monitor lateral view 300 for a flight path of an aircraft in accordance with one embodiment. The diagram shows a published flight plan 302 provided to the FMS and an RBT 306 that is also provided to the FMS on board the aircraft. A conformance boundary 308 that acts as a maximum containment region for the aircraft trajectory along with a conformance monitor. In this example, two track change points 304*a* and 304*b* are shown along the flight path where changes to the aircraft heading are planned. The trajectory conformance monitor may recalculate any actual or predicted deviations from the predicted flight trajectory at these track change points. The FMS generates a predicted lateral trajectory 310 for the aircraft. If the aircraft's present or predicted parameters exceed or are anticipated to exceed the conformance boundary during the flight 312, the conformance monitor will generate an advisory of an anticipated deviation from the predicted flight trajectory 310. The conformance monitor function will intuitively depict the portions of the non-conforming trajectory 312 either using a different color or other mechanisms.

Figure 4:
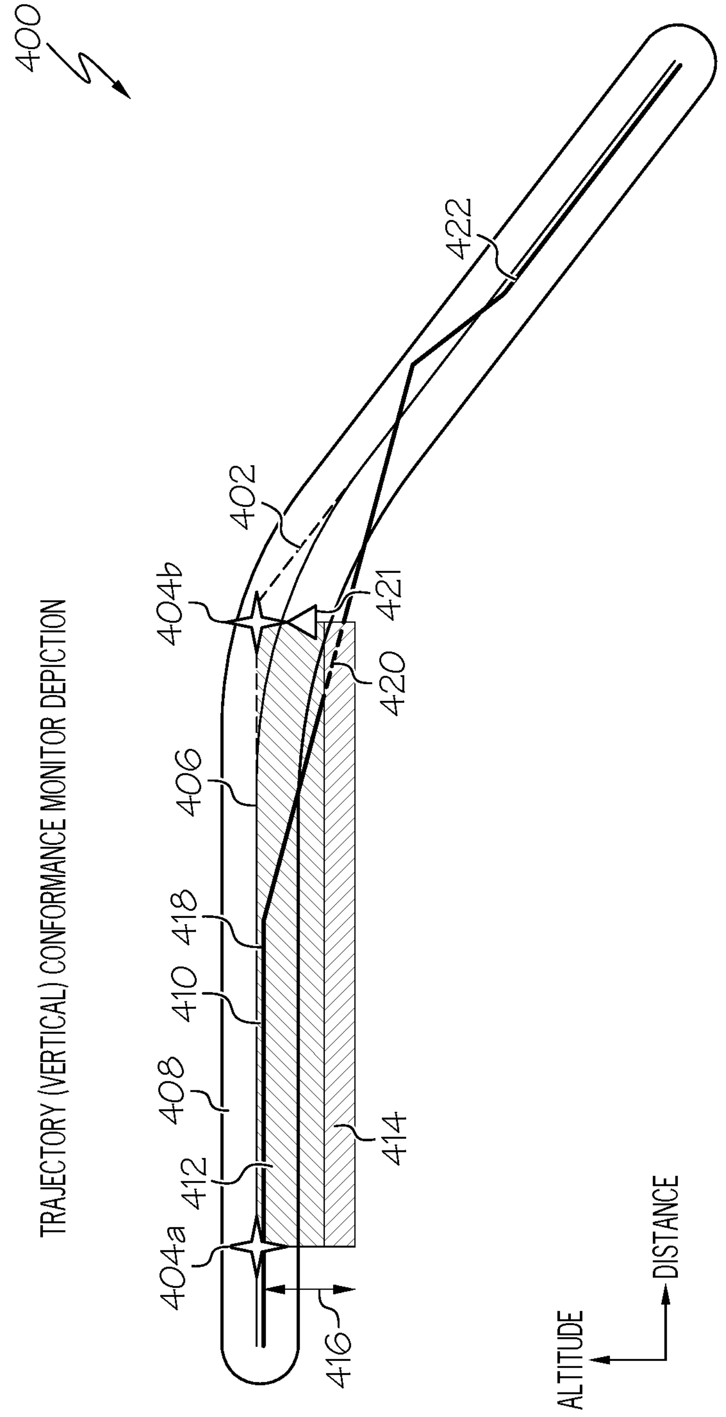
FIG. 4 shows a diagram depicting a conformance monitor vertical view for a flight path of an aircraft in accordance with one embodiment.

Turning now to FIG. 4, a diagram is shown of a graphic depiction a conformance monitor vertical view 400 for a flight path of an aircraft in accordance with one embodiment. As with the horizontal view previously described for FIG. 3, the vertical view 400 includes an RBT 406, a filed and published flight plan based on the RBT 402, and track vertical course change points 404*a* and 404*b* along the flight plan. As previously described, a conformance boundary 408 is also generated for maximum containment region for the aircraft. The trajectory conformance monitor will generate a predicted vertical trajectory 418 based on the current aircraft parameters. In this example, a permissible conformance altitude band 412 is shown that will allow the aircrew sufficient time to correct any actual or anticipated future deviations prior to the issuance of an advisory. If the aircraft dips below the conformance band 414, the conformance monitor will generate an advisory of an actual or anticipated deviation 420 from the predicted flight trajectory. In this example, the aircraft is shown with an anticipated deviation below an altitude constraint 421 that requires the aircraft to remain "at or above" a specified altitude.

Figure 5:
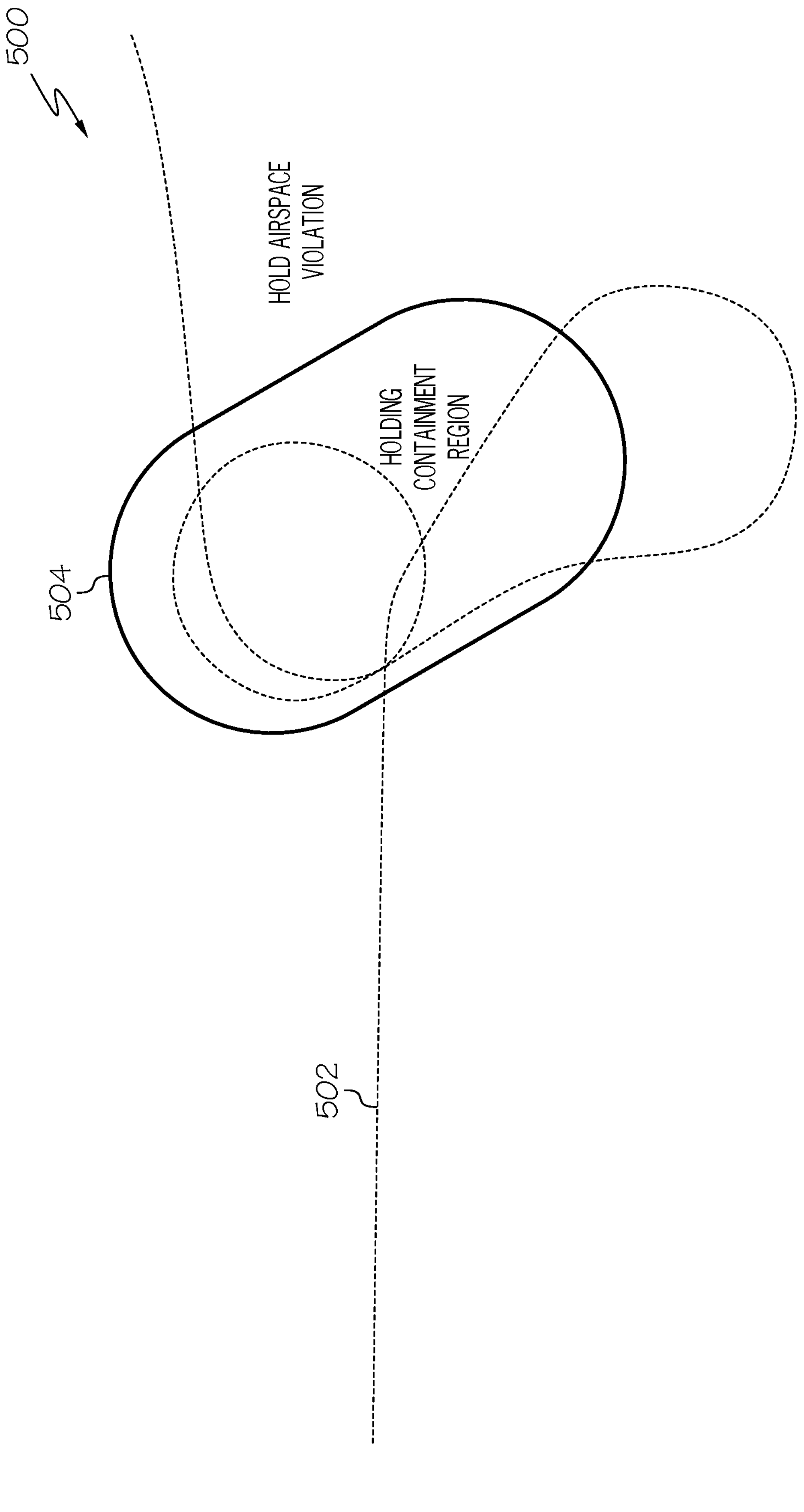
FIG. 5 shows a diagram depicting an example of an overshoot of a holding containment region for an aircraft in accordance with one embodiment.

Turning now to FIG. 5, a diagram is shown depicting examples 500 of overshoots of a holding containment region for an aircraft in accordance with one embodiment. In some embodiments, this information regarding a pattern of similar overshoots may be analyzed and compared to the RBT and related flight plans for aircraft operating in the holding containment region 504.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations. Those skilled in the art will also appreciate that the definition of a cloud based database that alternative embodiments may include several implementations known in the art.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as “first,” “second,” “third,” etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as “connect” or “coupled to” used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for monitoring conformance of an aircraft actual and a predicted 4-dimensional (4D) trajectory to a reference business trajectory (RBT), comprising:

defining an RBT for the aircraft as a set of rules which ensure the conformance of an aircraft trajectory to the prevailing airspace constraints, rules and systems performance standards;

acquiring a flight plan for the aircraft from an onboard flight management system (FMS) computer;

acquiring a predicted 4D flight trajectory corresponding to the flight plan acquired from the FMS computer, where the predicted flight trajectory is based on the latitude, longitude, altitude and time of the flight plan for the aircraft;

monitoring actual and predicted portions of the 4D flight trajectory of the aircraft with an onboard trajectory conformance monitor that is independent of the FMS computer;

anticipating future deviations of the predicted flight trajectories to the RBT; and generating an advisory for an aircrew member of the aircraft of the anticipated future deviations from the predicted flight trajectory to the RBT.

2. The method of claim 1, further comprising:

notifying air traffic control (ATC) of the advisory of the anticipated future deviations from the RBT.

3. The method of claim 1, further comprising:

notifying an aircraft operations center (AOC) of the advisory of the anticipated future deviations from the RBT.

4. The method of claim 2, where the ATC is notified using Aircraft Communications Addressing and Reporting System (ACARS) communication protocol.

5. The method of claim 2, where the ATC is notified via a satellite communication (SATCOM) broadband data link.

6. The method of claim 1, further comprising:

providing suggested corrective actions for the air crew member to correct the anticipated future deviations to the RBT.

7. The method of claim 1, further comprising:

graphically displaying the advisory for the aircrew member of the aircraft on an onboard display device.

8. The method of claim 1, further comprising:

storing details and related data of the advisory in a ground-based electronic database for later retrieval and analysis to identify conformity levels and equipment ratings of aircraft.

9. The method of claim 1, where the RBT includes a maximum containment region for the aircraft.

10. The method of claim 1, where anticipated future deviations from the predicted flight trajectory are calculated at a lateral or vertical track change point along the flight plan.

11. The method of claim 1, where allowable limits from the anticipated future deviations to the RBT are established to allow the aircrew member sufficient time to correct the anticipated future deviations prior to generating the advisory.

12. A system for monitoring conformance of an aircraft predicted 4-dimensional (4D) flight trajectory to a reference business trajectory (RBT), comprising:

an RBT generator located on a central cloud server remote to the aircraft and accessed via a communication channel, where the RBT generator generates, stores and provides RBTs for the aircraft;

a flight management system (FMS) computer located on board the aircraft, where the FMS, retrieves and stores a flight plan for the aircraft, generates a predicted 4D flight trajectory based on the flight plan for the aircraft, where the predicted 4D flight trajectory is based on latitude, longitude, altitude, speed and time of the flight plan for the aircraft, and monitors aircraft flight parameters during flight;

a trajectory conformance monitor located on board the aircraft, where the trajectory conformance monitor is configured to, retrieve the predicted 4D flight trajectory corresponding to the flight plan from the FMS, anticipate future deviations of the predicted 4D flight trajectory from the RBT based on the aircraft flight parameters, and generate an advisory of any predicted deviations from the RBT; and a ground-based server that receives and stores the advisory and associated flight and trajectory information issued by the trajectory conformance monitor.

13. The system of claim 12, further comprising:

a graphical display device that displays the advisory to an aircrew member of the aircraft.

14. The system of claim 13, where the graphical display device is an integrated component of the trajectory conformance monitor.

15. The system of claim 12, where the trajectory conformance monitor is independent of the FMS computer.

16. The system of claim 12, where the trajectory conformance monitor is an electronic flight bag (EFB).

17. The system of claim 12, where the trajectory conformance monitor is a mobile communications device.

18. The system of claim 12, where the trajectory conformance monitor notifies air traffic control (ATC) of the advisory of anticipated future deviations from the RBT.

19. The system of claim 12, where the trajectory conformance monitor is external to the aircraft on the cloud and only the advisory is transmitted to the aircraft.

20. The system of claim 12, where the trajectory conformance monitor is operated by an airline operations center (AOC) which integrates, displays and monitors 4D predicted flight trajectories for multiple aircraft for conformance with corresponding RBTs of the aircraft.

* * * * *